Patented Oct. 10, 1933

1,930,142

UNITED STATES PATENT OFFICE 1,930,142

CELLULOSE ESTER COMPOSITION

Hans T. Clarke, New York, and Charles E. Waring, Rochester, N. Y., assignors to Eastman Kodak Company, Rochester, N. Y., a corporation of New York No Drawing. Application April 6, 1929
Serial No. 353,253

15 Claims. (Cl. 106—40)

This invention relates to new compositions of matter and particularly to cellulose esters which are combined or mixed with other substances in order that the resulting products can be advantageously used in the lacquer arts and also, for instance, in sheet or film form in photographic manufacture.

In the manufacture of films or lacquers using cellulose esters, it is essential to add to the ester some compound or compounds to increase their flexibility. In the photographic art in particular, it is necessary that the cellulose ester film be transparent, strong and flexible, particularly when used for motion picture purposes. Flatness is also necessary in some instances when the film is used in sheet form. It is also necessary that the ingredients which are added to the cellulose ester do not in any way affect the light-sensitive layers and that the ingredients are not affected by the developing and fixing baths during the treatment of the film.

The object of the present invention is to provide a composition of matter which has the hereinabove described advantages. It is also the object of this invention to describe a new composition of matter not heretofore known.

We have discovered that, if cellulose esters are combined with phenolic esters of chlorine substituted aromatic sulphonic acids, products result which have especially advantageous characteristics. They render the product more impermeable to water as well as increasing the flexibility and transparency of films that may be made therefrom.

We have found that phenyl para-chloro benzene sulphonate, which is a colorless crystalline compound which melts at 92° C., ortho-cresyl-para-chloro-benzene-sulphonate having a melting point of 64–65° C., and phenyl 3.4 dichloro benzene sulphonate having a melting point of 85° C. are particularly well adapted for our purpose. As these compounds have not heretofore been made, we will describe herein a method for their manufacture which will enable those skilled in this art to prepare them.

The general method for the preparation of phenolic esters of chlorine substituted aromatic sulphonic acids is as follows:

Chloro benzene 1 part is treated in a suitable container with 5 parts of chloro sulphonic acid at a temperature of 25° C. There is formed from the resulting reaction the para-chloro-benzene-sulpho-chloride. This is in turn caused to react with the desired phenol in the presence of a dilute caustic soda solution. A phenyl chloro-benzene sulphonic acid is produced.

If the di-chloro-benzene-sulphonate is desired, one part of ortho di-chloro benzene is stirred with 5 parts of chloro sulphonic acid at 90° C. The sulpho-chloride is isolated and allowed to react with phenols in the same manner as described above.

In using these compounds with cellulose esters, it has been found that, particularly with cellulose acetate and cellulose nitrate, they will combine in any proportions from 5% to 50% of the weight of the cellulose ester, it of course being usually necessary to combine them in the presence of a common solvent such, for example, as acetone. If an exceedingly fluid cellulose ester dope is required,—such fluidity is necessary in the lacquer art and especially when the lacquer is to be sprayed—it is merely necessary to add more of the common solvent. The liquid medium may, however, be increased, as will be understood by those skilled in the art, by the use of benzol, alcohol, and the like, which are in effect non-solvents of the cellulose ester provided they are added in amounts insufficient to precipitate the esters from the solution. Along with the ingredients given above, we may add one or more organic bodies of only slight or intermediate volatility which enhance the plasticity and flexibility of the compositions and regulate the smooth flowing of the composition when used, particularly in film manufacture. But such bodies are not preferred or essential. Examples of them are amyl and butyl acetate, the various amyl alcohols, the various butyl alcohols, and mixtures of them. Plastifiers may also be used in admixture with the above compositions, such for example as monochlornaphthalene, tri-cresyl phosphate, or cresyl paratoluene sulphonate.

The compounds herein disclosed can be produced from nearly valueless by-products, namely, the mixture of ortho- and para-di-chloro benzene which is obtained as an oil in the manufacture of para-di-chloro benzene. It is found that only the ortho-di-chloro benzene compound reacts with the chloro sulphonic acid at 90° C. so that the unattacked para compound can be isolated as a valuable by-product in the reaction. The use of these compounds therefore have, together with the property of imparting exceptional qualities to the cellulosic composition, decided economic advantages.

The ingredients and proportions of the described compositions of matter may be varied and equivalents substituted without in any way departing from the invention or sacrificing any of its advantages.

Having thus described our invention, what we claim as new and desire to secure by Letters Patent is:

1. A composition of matter comprising a cellulose ester and an aryl ester of a halogen substituted aromatic sulphonic acid selected from the group consisting of phenyl para-chloro-benzene sulphonate, ortho-cresyl para-chloro-benzene sulphonate, and phenyl 3.4-di-chloro-benzene sulphonate.

2. A composition of matter comprising a cellulose ester and an aryl ester of a halogen substituted aromatic sulphonic acid selected from the group consisting of phenyl para-chloro-benzene sulphonate, ortho-cresyl para-chloro-benzene sulphonate, and phenyl 3.4-di-chloro-benzene sulphonate, and a solvent common to both.

3. A composition of matter comprising a cellulose ester and an aryl ester of a chlorine substituted aromatic sulphonic acid selected from the group consisting of phenyl para-chloro-benzene sulphonate, ortho-cresyl para-chlorobenzene sulphonate, and phenyl 3.4-di-chloro-benzene sulphonate and a substance which enhances the flexibility thereof.

4. A composition of matter comprising a cellulose acetate and an aryl ester of a halogen substituted aromatic sulphonic acid selected from the group consisting of phenyl para-chloro-benzene sulphonate, ortho-cresyl para-chloro-benzene sulphonate, and phenyl 3.4-di-chloro-benzene sulphonate.

5. A composition of matter comprising a cellulose acetate and an aryl ester of a halogen substituted aromatic sulphonic acid selected from the group consisting of phenyl para-chloro-benzene sulphonate, ortho-cresyl para-chloro-benzene sulphonate, and phenyl 3.4-di-chloro-benzene sulphonate, and a common solvent.

6. A composition of matter comprising a cellulose acetate and an aryl ester of a chlorine substituted aromatic sulphonic acid selected from the group consisting of phenyl para-chloro-benzene sulphonate, ortho-cresyl para-chloro-benzene sulphonate, and phenyl 3.4-di-chloro-benzene sulphonate and a substance to enhance the flexibility thereof.

7. As an article of manufacture, a sheet of deposited or flowed cellulose ester containing an aryl ester of a halogen substituted aromatic sulphonic acid selected from the group consisting of phenyl para-chloro-benzene sulphonate, ortho-cresyl para-chloro-benzene sulphonate, and phenyl 3.4-di-chloro-benzene sulphonate.

8. As an article of manufacture, a sheet of deposited or flowed cellulose acetate containing an aryl ester of a halogen substituted aromatic sulphonic acid selected from the group consisting of phenyl para-chloro-benzene sulphonate, ortho-cresyl para-chloro-benzene sulphonate, and phenyl 3.4-di-chloro-benzene sulphonate.

9. A composition of matter comprising cellulose acetate, phenyl-para-chloro-benzene-sulphonate and acetone.

10. A composition of matter comprising a cellulose acetate, and phenyl 3-4 dichlorobenzene sulphonate.

11. As an article of manufacture, a sheet of deposited or flowed cellulose acetate containing phenyl 3-4 dichlorobenzene sulphonate.

12. A composition of matter comprising cellulose acetate and phenyl para-chloro-benzene sulphonate.

13. A composition of matter comprising cellulose acetate and ortho-cresyl para-chloro-benzene sulphonate.

14. As an article of manufacture, a sheet of deposited or flowed cellulose acetate containing phenyl para-chloro benzene sulphonate.

15. As an article of manufacture, a sheet of deposited or flowed cellulose acetate containing ortho-cresyl para-chloro-benzene sulphonate.

CHARLES E. WARING.
HANS T. CLARKE.